H. W. ALEXANDER.
RECORDING DEVICE.
APPLICATION FILED JUNE 4, 1918.

1,291,351.

Patented Jan. 14, 1919.
2 SHEETS—SHEET 1.

WITNESSES

*Henry W. Alexander,* INVENTOR

BY
ATTORNEYS

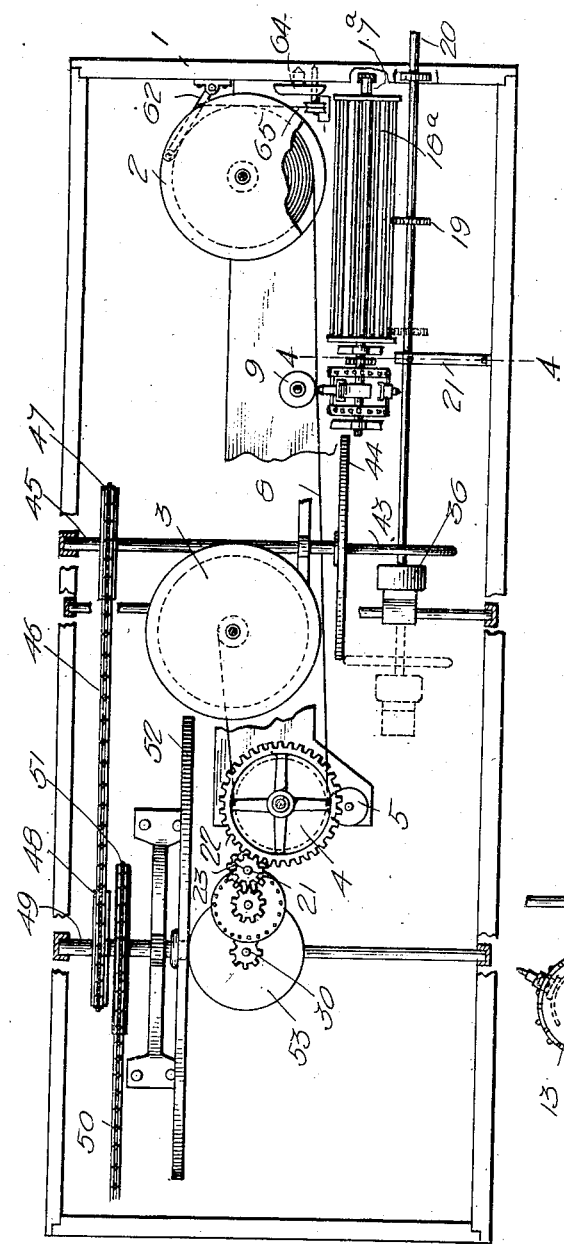

UNITED STATES PATENT OFFICE.

HENRY WALKER ALEXANDER, OF LAS ANIMAS, COLORADO.

RECORDING DEVICE.

1,291,351. Specification of Letters Patent. Patented Jan. 14, 1919.

Application filed June 4, 1918. Serial No. 238,181.

*To all whom it may concern:*

Be it known that I, HENRY W. ALEXANDER, a citizen of the United States, and a resident of Las Animas, in the county of Bent and State of Colorado, have invented a new and useful Improvement in Recording Devices, of which the following is a specification.

My invention is an improvement in recording devices and has for its object to provide a device of the character specified adapted for use with a vehicle and to be driven by the vehicle, to record the profile of the surface passed over by the vehicle.

In the drawings:—

Fig. 2 is a top plan view,

Fig. 3 is a detail side view of the marker,

Fig. 4 is a section n the line 4—4 of Fig. 2,

Figures 1, 5:
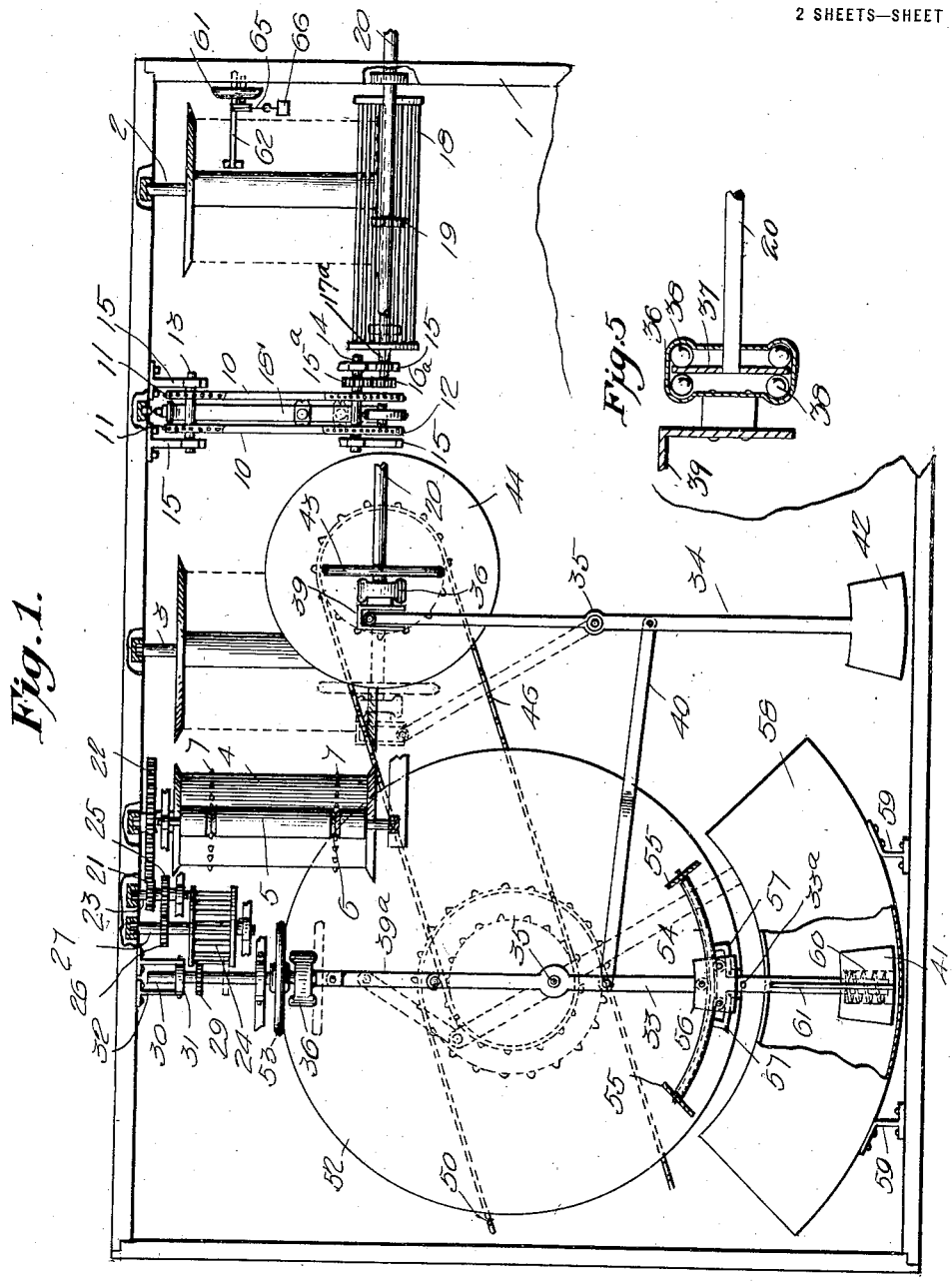
Figure 1 is a side view of the improved device.
Fig. 5 is a sectional view through the connection between the pendulum staffs and the shaft.

In the present embodiment of the invention a suitable casing 1 is provided in which is journaled reels 2 and 3 for supporting the strip of paper upon which the record is to be made. These reels are journaled in the frame and the strip at the beginning is wound upon the reel 2, passing from this reel to the reel 3. Between the reels the strip passes between a pair of coöperating rollers 4 and 5. The roller 5 has annular V-shaped grooves 6 near its ends and the roller 4 has an annular series of teeth 7 at each groove, the teeth moving in the grooves when the rollers are rotated. The teeth piercing the paper strip insure a uniform even feed of the strip without any possibility of slipping. The roller 4 is a driving roller for the strip 8 and between the reel 2 and the rollers 4 and 5 the strip passes over a supporting roller 9 where the record is made.

The markers to be described are carried by a pair of endless chains 10 which are supported by pairs of sprocket wheels 11 and 12 which are mounted on shafts 13 and 14, the members of the pairs being spaced apart from each other and registering with the corresponding members of the other pair. The shafts 13 and 14 are journaled in brackets 15 supported by the casing and the chains carry the markers, three markers being provided in the present instance, and the parts are so proportioned and arranged that one marker will always be in position to mark upon the strip.

Each marker carries a marking device 17, as for instance a pencil, pen or the like, and the markers are supported and guided on the roller by a guide 18' which holds the pen or pencil in contact with the paper strip at this point. It will be noticed referring to Fig. 3 that the ends of the guide curve about the shafts 13 and 14 as a center. The chains are driven by means of a gear wheel or pinion $15^a$ on the shaft 14 which meshes with the pinion $16^a$ on a shaft $17^a$ journaled in the casing. This shaft $17^a$ carries a gear wheel 18, which is elongated for a purpose to be presently described. This gear wheel is composed of disks secured to the shaft in spaced relation and connected by rods which are spaced apart the proper distance to be engaged by the teeth of the pinion 19 which is mounted on a shaft 20 journaled in the casing and driven in a manner to be described.

The roller 4 is provided with a gear wheel 22 at one end which meshes with a pinion 21 on a counter-shaft 23 and this shaft carries another pinion 25 which meshes with a pinion 26 on a shaft 27 journaled in the casing and carrying a gear wheel 24 corresponding in construction to that of the gear wheel $18^a$, but of less length. With this gear wheel 24 meshes a pinion 29 on a shaft 30. The shafts 20 and 30 are mounted to slide longitudinally in their bearings and the gear wheels 18 and 24 are made long so that the pinions will still mesh with the gear wheels whatever the position of the shafts 20 and 30. The shaft 30 is mounted to slide in a bearing 31 at the end adjacent to the casing wall and the said bearing is supported by arms 32 on the casing.

Pendulum staffs 33 and 34 are supported in the casing, the said staffs being pivoted intermediate their ends as indicated at 35, and the staffs are connected at their upper ends with the shafts 30 and 20, respectively. The connection, as shown more particularly in Fig. 4, is by means of a casing 36, of cylindrical form, in which the adjacent end of the shaft 20 or 30, as the case may be, is received. The shaft 20 or 30 carries a plate or disk 37 which is secured thereto, and this plate or disk is received between ball bearings 38 which are held in races in the casing at opposite faces of the plate.

The casing 36 at the shaft 20 is connected to the upper end of the pendulum staff 34 by means of a stirrup 39, the staff 34 having at its upper end a roller head which rotates in the stirrup. The staff 33 is connected with the casing 36 of the shaft 30 by means of a link 39ª. The pendulums 41 and 42 are connected with the lower ends of the staffs 33 and 34, respectively, and it will be evident that when the casing and the parts supported thereby move out of the vertical, the pendulums 41 and 42 will cause the staffs 33 and 34 to hold a vertical position, and the shafts 30 and 20 will be moved longitudinally in their bearings. This moving will not, however, disengage the pinions 19 and 29 from the gear wheels 18 and 24. The pendulums 41 and 42 are connected with the staffs 33 and 34 in a manner to be presently described, and the two staffs are connected by a link 40 which constrains the staffs to swing together.

Wheels 43 and 53 are secured to the shafts 20 and 30, respectively, and these wheels engage the faces of disks 44 and 52, respectively, the wheel 43 normally engaging the disk 44 to the center, while the wheel 53 normally engages the disk 52 at its periphery. The disk 44 is secured to a shaft 45 and the disk 52 is secured to a shaft 49. These shafts are connected by a sprocket chain 46 which connects wheels 47 and 48 on the respective shafts, and the shaft 49 is driven by a sprocket chain 50 which connects a sprocket wheel 51 on the shaft 49 with the hub of the vehicle on which the device is mounted through intermediate gears (not shown).

Two methods of retarding or damping the vibration of the pendulums are provided and either or both may be used. In the one construction an arc-shaped bar 54 is supported by the casing, being connected to the casing by brackets 55, and the pendulum 33 has a shoe 56 which rolls upon the bar when the staff swings. Double-angle levers 57 are pivoted to the shoe, each lever consisting of a body having at each end an arm and the arms extending in opposite directions, and the levers are pivoted to the shoe at the junction of the body with one of the arms. The arrangement is such that the free end of the other arm moves close to the bar 54. The pendulum staff has a laterally extending pin 33ª which normally stands midway between the first-named arms of the levers, but it will be obvious that since the staff may move with respect to the shoe that sudden movement of the staff will cause the pin to engage a lever to cause it to engage the bar to brake or dampen the movement of the staff.

The other method consists of a casing 58 in which the pendulum 41 moves, and this casing is curved on an arc whose center is the pivotal connection 35 of the staff 33. This casing is supported from the casing 1 by brackets 59 and the casing is air-tight with the exception of a slot through which the staff 33 extends. The staff has wings 61 of linen or the like which are supported by light frames, and these wings move with their edges just out of contact with the casing wall. In the comparatively inclosed space of the casing with a large wing area the air will offer resistance to any sudden movement while not at all opposing a gradual settlement to vertical position. The bob or pendulum 41 is yieldingly connected with its staff, a spring 60 being interposed between the staff and the pendulum.

Mechanism is also provided to indicate when the paper is exhausted or nearly exhausted from the reel 2. The said mechanism comprises a striker or hammer 62 which is pivoted at 63 above the reel, in such manner that the free end of the hammer or striker will normally rest upon the paper on the reel. A bell 64 is arranged below the reel and below the striker and in position to be engaged thereby when the striker swings downward. The striker or hammer is of such length that it may pass the reel when the reel is empty or nearly so, as indicated in Fig. 1 and the striker is normally pulled downward by a flexible member 65 connected at one end to the striker and at the other to a counterweight 66.

In operation with the device in place on a vehicle and connected to a moving part thereof to be driven thereby it will be obvious that so long as the vehicle moves over level ground there will be no swinging movement of the pendulum and the shafts 20 and 30 will hold the positions shown in Fig. 1, normally with the wheel 43 at the center of the disk 44 and with the wheel 53 at the periphery of the disk 52. The shaft 20 will remain idle, since the wheel 43 is at the center of the disk and will not be driven thereby. The roller 4 will be driven continuously to move the strip of paper at a predetermined speed from the reel 2 to the reel 3, and that marker which is in engagement with the paper will mark a straight line substantially parallel with the side edges of the strip showing that the ground traveled over is level. Should, however, the vehicle move up an incline, the pendulums will hold the staffs in vertical position, and the wheel 43 will be moved to the left of the center of the disk 44, the distance moved depending upon the angle of the inclination.

Now motion is imparted to the shaft 20, since the wheel 43 is off the center of the disk and the endless chains 10 will be driven, the markers moving toward the top of Fig. 1, so that the line drawn by the pencil 17 will incline upwardly toward the top of the paper. On the other hand, should the vehicle move down an incline the pendulums will swing in the opposite direction and the wheel 43 will be moved to the right of the center of the disk 44. The markers will now be moved in the opposite direction, that is, toward the bottom of the strip, and the line drawn by the pencil will move downward. Thus every variation from the level will be recorded and at the end of the trip the paper strip will bear a written record of the profile of the surface traveled over. When the strip is nearly exhausted from the reel 2 the striker will fall and will signal the state of the facts to those concerned.

Not only is the direction of motion of the shaft 20 changed when the wheel 43 moves from one side of the center of the disk 44 to the other, but the speed of said shaft is also varied in accordance with the distance of the wheel 43 from the center of the disk. The speed of the shaft 30 does not vary greatly, since the wheel 53 has but a limited movement, being always near the periphery of the disk 52. These disks 44 and 52 also act as brakes on the movement of the pendulums. An important point to be considered in connection with the movement of the pendulums is that mere movement, that is, a gentle vibration is not prejudicial to results provided only that the swing to each side of the wheel is approximately the same, and that the swing be not so violent as to interfere with the rotation of the disks 44 and 52.

Any profile or grade may be supposed for practical purposes to consist of a series of right angled triangles in which the horizontal component of the profile (or triangle) is equal to the distance measured on the slope multiplied by the cosine of the slope or grade angle. In the same manner the vertical component or rise is equal to the slope distance multiplied by the sine of the slope angle.

By the composition of motions, if a marker, as a pencil, be acted upon by two forces at the same time, which acting independently upon it for the same unit of time would cause it respectively to move distances equal to the cosine of an angle horizontally and a sine vertically, the actual path traced by the pencil would be along the hypotenuse of the right angled triangle containing the acute angle. In other words, it would trace the slope or profile represented by the angle. This is essentially what is done in the apparatus in question, with this distinction. The marker or pencil moves only vertically, the movement being proportionate to the sine of the grade at every point. However, the paper upon which it presses moves proportionally to the cosine of the grade angle in a horizontal direction. To be more accurate the movement of the pencil and paper are at right angles to each other and not actually vertical and horizontal. The result, however, is the same.

In Fig. 4 is shown the manner of supporting the shafts 20 and 30 in their bearings. A ball bearing race is provided, consisting of an inner section 70 and an outer section 71, the balls 72 being arranged between the race sections. The shaft 20 is slidable through the inner section and grooved rollers 73 are arranged above and below the shaft against which the shaft may move.

I claim:—

1. A device of the character specified comprising means for supporting and moving a strip of paper longitudinally, an endless carrier arranged transversely of the strip above the same, markers carried by the endless carrier and engaging the strip for marking the same as it moves longitudinally, means for supporting the strip in contact with the markers, said markers being so spaced that one marker will always be in contact with the strip, a shaft having a driving connection with the strip moving means for operating the same, a shaft having a connection with the endless carrier for driving the same, a wheel on each shaft, disks with whose faces the wheels engage, the wheel of the shaft controlling the carrier normally engaging the center of its disk and the wheel of the shaft controlling the moving of the strip normally engaging the periphery of its disk, a pendulum staff pivoted intermediate its ends adjacent each of the said shafts and provided with a pendulum at its lower end and having a connection with the adjacent shaft at its upper end for moving the said shaft longitudinally when the pendulum swings, a connection between the pendulums for constraining them to swing together and means for connecting the disks with the wheel of a vehicle to cause them to move at the same proportionate speed, and means for damping the movement of the pendulums, said means comprising a closed casing in which one of the pendulums moves, the said pendulum and staff having wings fitting the casing.

2. A device of the character specified comprising means for supporting and moving a strip of paper longitudinally, an endless carrier arranged transversely of the strip above the same, markers carried by the endless carrier and engaging the strip for marking the same as it moves longitudinally, means for supporting the strip in contact with the markers, said markers being so spaced that one marker will always be in contact with the strip, a shaft having a driving connection with the strip moving means for operating the same, a shaft having a connection with the endless carrier for driving the same, a wheel on each shaft, disks with whose faces the wheels engage, the wheel of the shaft controlling the carrier normally engaging the center of its disk and the wheel of the shaft controlling the moving of the strip normally engaging the periphery of its disk, a pendulum staff pivoted intermediate its ends adjacent each of the said shafts and provided with a pendulum at its lower end and having a connection with the adjacent shaft at its upper end for moving the said shaft longitudinally when the pendulum swings, a connection between the pendulums for constraining them to swing together and means for connecting the disks with the wheel of a vehicle to cause them to move at the same speed, and means for damping the movement of the pendulums, said means comprising a fixed arc-shaped bar, a shoe carried by one of the pendulum staffs and moving along the bar, brake shoes in connection with the shoe for engaging the bar and means on the pendulum staff for operating the shoe.

3. A device of the character specified comprising means for supporting and moving a strip of paper longitudinally, an endless carrier arranged transversely of the strip above the same, markers carried by the endless carrier and engaging the strip for marking the same as it moves longitudinally, means for supporting the strip in contact with the markers, said markers being so spaced that one marker will always be in contact with the strip, a shaft having a driving connection with the strip moving means for operating the same, a shaft having a connection with the endless carrier for driving the same, a wheel on each shaft, disks with whose faces the wheels engage, the wheel of the shaft controlling the carrier normally engaging the center of its disk and the wheel of the shaft controlling the moving of the strip normally engaging the periphery of its disk, a pendulum staff pivoted intermediate its ends adjacent each of the said shafts and provided with a pendulum at its lower end and having a connection with the adjacent shaft at its upper end for moving the said shaft longitudinally when the pendulum swings, a connection between the pendulums for constraining them to swing together and means for connecting the disks with the wheel of a vehicle to cause them to move at the same proportionate speed, and means for damping the movement of the pendulums.

4. A device of the character specified comprising means for supporting and moving a strip of paper longitudinally, an endless carrier arranged transversely of the strip above the same, markers carried by the endless carrier and engaging the strip for marking the same as it moves longitudinally, means for supporting the strip in contact with the markers, said markers being so spaced that one marker will always be in contact with the strip, a shaft having a driving connection with the strip moving means for operating the same, a shaft having a connection with the endless carrier for driving the same, a wheel on each shaft, disks with whose faces the wheels engage, the wheel of the shaft controlling the carrier normally engaging the center of its disk and the wheel of the shaft controlling the moving of the strip normally engaging the periphery of its disk, a pendulum staff pivoted intermediate its ends adjacent each of the said shafts and provided with a pendulum at its lower end and having a connection with the adjacent shaft at its upper end for moving the said shaft longitudinally when the pendulum swings, a connection between the pendulums for constraining them to swing together and means for connecting the disks with the wheel of a vehicle to cause them to move at the same proportionate speed.

5. A device of the character specified, comprising means for supporting and moving a strip of paper longitudinally, a marker mounted to move transversely of the strip, means for moving the marker, a wheel connected with each of the said moving means for operating the same, a disk for each wheel with whose face the wheel engages, the marker wheel engaging the center of its disk and the paper strip moving wheel engaging the periphery of its disk, said wheels being movable radially of the disks, a pendulum connected with each wheel for moving the same a connection between the pendulums for constraining them to move together, and means for damping the movement of the pendulums, the marker moving wheel being movable toward both sides of the center of the disk, said disks being adapted for connection with moving means to move the same.

6. A device of the character specified, comprising means for supporting and moving a strip of paper longitudinally, a marker mounted to move transversely of the strip, means for moving the marker, a wheel connected with each of the said moving means for operating the same, a disk for each wheel with whose face the wheel engages, the marker wheel engaging the center of its disk and the paper strip moving wheel engaging the periphery of its disk, said wheels being movable radially of the disks, a pendulum connected with each wheel for moving the same, a connection between the pendulums for constraining them to move together and means for damping the movement of the pendulums, said disks being adapted for connection with moving means to move the same.

7. A device of the character specified, comprising means for supporting and moving a strip of paper longitudinally, a marker mounted to move transversely of the strip, means for moving the marker, a wheel connected with each of the said moving means for operating the same, a disk for each wheel with whose face the wheel engages, the marker wheel engaging the center of its disk and the paper strip moving wheel engaging the periphery of its disk, said wheels being movable radially of the disks, a pendulum connected with each wheel for moving the same, a connection between the pendulums for constraining them to move together, said disks being adapted for connection with moving means to move the same.

HENRY WALKER ALEXANDER.

Witnesses:
P. G. SCOTT,
MARIE BECK.